(12) United States Patent
Forti et al.

(10) Patent No.: US 7,699,208 B2
(45) Date of Patent: Apr. 20, 2010

(54) SOLDERING TIP, SOLDERING IRON, AND SOLDERING SYSTEM

(75) Inventors: Michael S. Forti, Franklin, MA (US);
Kevin W. Gaugler, Lincoln, RI (US);
John A. Vivari, Jr., Greenville, RI (US);
Keith Wheeler, Coventry, RI (US)

(73) Assignee: Nordson Corporation, Westlake, OH (US)

( * ) Notice: Subject to any disclaimer, the term of this patent is extended or adjusted under 35 U.S.C. 154(b) by 92 days.

(21) Appl. No.: 11/948,544

(22) Filed: Nov. 30, 2007

(65) Prior Publication Data

US 2009/0140028 A1 Jun. 4, 2009

(51) Int. Cl.
*B23K 3/02* (2006.01)
*B23K 3/03* (2006.01)

(52) U.S. Cl. .......................................... 228/51; 228/54
(58) Field of Classification Search ........................ None
See application file for complete search history.

(56) References Cited

U.S. PATENT DOCUMENTS

| | | | | |
|---|---|---|---|---|
| 2,311,776 | A | * | 2/1943 | Powell ........................ 148/253 |
| 2,780,712 | A | * | 2/1957 | Thomas ........................ 228/53 |
| 3,080,842 | A | * | 3/1963 | Rice ............................. 228/54 |
| 3,136,878 | A | * | 6/1964 | Staller ........................ 219/239 |
| 3,315,350 | A | * | 4/1967 | Kent ........................... 205/149 |
| 3,410,472 | A | * | 11/1968 | Weller et al. ................... 228/51 |
| 3,518,407 | A | * | 6/1970 | Ekkehard ..................... 219/229 |
| 3,786,228 | A | * | 1/1974 | Castellana et al. .......... 219/233 |
| 3,813,023 | A | | 5/1974 | Auray et al. |
| 3,815,806 | A | | 6/1974 | Paxton |
| 3,943,326 | A | | 3/1976 | Henry |
| 3,945,553 | A | | 3/1976 | Nicosia |
| 3,948,678 | A | | 4/1976 | Dezzani |
| 3,970,234 | A | | 7/1976 | Litt et al. |
| 3,977,036 | A | | 8/1976 | Vanyi |
| 3,984,655 | A | | 10/1976 | Wahl |
| 3,990,623 | A | | 11/1976 | Fortune |
| 4,065,084 | A | | 12/1977 | Wiener |
| 4,082,940 | A | | 4/1978 | Knowles et al. |
| 4,086,465 | A | | 4/1978 | Sylvester |

(Continued)

FOREIGN PATENT DOCUMENTS

| | | |
|---|---|---|
| DE | 102006024281 A1 | 11/2007 |
| JP | 06203942 A | 7/1994 |
| JP | 08155633 A * | 6/1996 |
| JP | 11010325 A | 1/1999 |

OTHER PUBLICATIONS

Derwent 2004-534979.*

(Continued)

*Primary Examiner*—Kiley Stoner
(74) *Attorney, Agent, or Firm*—Wood, Herron & Evans, L.L.P.

(57) ABSTRACT

A soldering system for melting a solder to form a joint between a first workpiece and a second workpiece is described. The system may comprise an energy generating system, a soldering tip, and a dispenser adapted to dispense controlled amounts of the solder. The soldering tip includes a non-wetting solder contact layer in operative communication with the energy generating system. The energy generating system may include induction, electrical, or heat generating systems in communication with the soldering tip. The non-wetting solder contact layer comprises a material that is not wettable by the molten solder. The system permits control of an amount of the solder in the joint.

9 Claims, 2 Drawing Sheets

U.S. PATENT DOCUMENTS

| | | | |
|---|---|---|---|
| 4,090,656 A | 5/1978 | Sato et al. | |
| 4,118,821 A | 10/1978 | Kuhn | |
| 4,119,088 A | 10/1978 | Sim | |
| 4,121,092 A | 10/1978 | Undin | |
| 4,187,972 A | 2/1980 | Vella | |
| 4,206,864 A | 6/1980 | Rauchwerger | |
| 4,224,744 A | 9/1980 | Siegel et al. | |
| 4,243,875 A | 1/1981 | Chang | |
| 4,251,043 A | 2/1981 | Horner | |
| 4,325,356 A | 4/1982 | Taschler | |
| 4,340,029 A | 7/1982 | Kelly, Jr. | |
| 4,358,661 A | 11/1982 | Kaderabek | |
| 4,358,662 A | 11/1982 | Cranor et al. | |
| 4,394,785 A | 7/1983 | Vogler | |
| 4,418,268 A | 11/1983 | Munshaw | |
| 4,420,110 A * | 12/1983 | McCullough et al. | 228/54 |
| 4,424,795 A | 1/1984 | Plessner | |
| 4,424,930 A * | 1/1984 | Wilhelmson | 228/20.5 |
| 4,431,903 A | 2/1984 | Riccio | |
| 4,434,925 A | 3/1984 | Jacobs | |
| 4,436,242 A | 3/1984 | Shisler et al. | |
| 4,441,014 A | 4/1984 | Hong | |
| 4,450,351 A | 5/1984 | Fraden | |
| 4,455,138 A | 6/1984 | Sheridan | |
| 4,459,463 A | 7/1984 | Knowles | |
| 4,463,247 A | 7/1984 | Lawrence et al. | |
| 4,468,555 A | 8/1984 | Adachi et al. | |
| 4,473,181 A | 9/1984 | Grabow, Jr. | |
| 4,493,449 A | 1/1985 | Kleiman | |
| 4,507,545 A | 3/1985 | Riordan | |
| 4,515,550 A | 5/1985 | Miller | |
| 4,521,673 A | 6/1985 | Oury | |
| 4,544,829 A | 10/1985 | Adachi et al. | |
| 4,560,101 A | 12/1985 | Wilhelmson et al. | |
| 4,587,723 A | 5/1986 | Scuro | |
| 4,590,363 A | 5/1986 | Bernard | |
| 4,596,109 A | 6/1986 | Miller | |
| 4,607,151 A | 8/1986 | Kihlstrom | |
| 4,614,295 A | 9/1986 | Köchli | |
| 4,648,545 A | 3/1987 | Polckemann | |
| 4,649,374 A | 3/1987 | Hoigaard | |
| 4,662,022 A | 5/1987 | Vogler | |
| 4,671,476 A | 6/1987 | Yim | |
| 4,687,903 A | 8/1987 | Zimmerman | |
| 4,688,552 A | 8/1987 | Tsai | |
| 4,690,318 A | 9/1987 | Hite | |
| 4,690,724 A | 9/1987 | Outlaw | |
| 4,691,691 A | 9/1987 | Patenaude | |
| 4,708,278 A | 11/1987 | Opfer | |
| 4,716,885 A | 1/1988 | Zaborowski | |
| 4,735,354 A | 4/1988 | Yagi et al. | |
| 4,758,063 A | 7/1988 | Konechny, Jr. | |
| 4,762,979 A | 8/1988 | Geoffroi | |
| 4,771,932 A | 9/1988 | Kim | |
| 4,775,422 A | 10/1988 | Kabe | |
| 4,795,076 A * | 1/1989 | Gottschild | 228/54 |
| 4,803,748 A | 2/1989 | Quasney, Sr. | |
| 4,805,593 A | 2/1989 | Hsu | |
| 4,805,830 A | 2/1989 | Kawaguchi | |
| 4,822,979 A | 4/1989 | deKam | |
| 4,830,260 A | 5/1989 | Kent | |
| 4,830,646 A | 5/1989 | Rossberg | |
| 4,832,246 A | 5/1989 | Ono et al. | |
| 4,839,501 A | 6/1989 | Cowell | |
| 4,859,992 A | 8/1989 | Hoigaard | |
| 4,861,169 A | 8/1989 | Yoshimura | |
| 4,861,967 A | 8/1989 | Yoshimura | |
| 4,864,723 A | 9/1989 | Griffith et al. | |
| 4,868,369 A | 9/1989 | Chen | |
| 4,872,605 A | 10/1989 | Rinko | |
| 4,873,608 A | 10/1989 | Yoshimura | |
| 4,878,016 A | 10/1989 | Wahl et al. | |
| 4,883,942 A | 11/1989 | Robak, Sr. et al. | |
| 4,891,497 A | 1/1990 | Yoshimura | |
| 4,896,019 A | 1/1990 | Hyun | |
| 4,899,924 A | 2/1990 | Kawaguchi | |
| 4,924,067 A | 5/1990 | Wilhelmson | |
| 4,932,393 A | 6/1990 | Sim | |
| 4,934,309 A | 6/1990 | Ledermann et al. | |
| 4,935,600 A | 6/1990 | Pachschwöll | |
| 4,939,453 A | 7/1990 | Kautter et al. | |
| 4,940,178 A | 7/1990 | Hombrecher | |
| 4,945,210 A | 7/1990 | Yoshimura | |
| 4,948,946 A | 8/1990 | Fukunaga | |
| 4,960,975 A | 10/1990 | Weinbrecht | |
| 4,966,128 A | 10/1990 | Wang | |
| 4,974,768 A * | 12/1990 | Ebata | 228/54 |
| 4,997,121 A | 3/1991 | Yoshimura | |
| 4,999,480 A | 3/1991 | Smith | |
| 5,019,688 A | 5/1991 | Cheng | |
| 5,021,634 A | 6/1991 | Santoro et al. | |
| 5,025,973 A | 6/1991 | Newton et al. | |
| 5,031,817 A | 7/1991 | Chen | |
| 5,042,708 A | 8/1991 | Ledermann et al. | |
| 5,062,529 A | 11/1991 | Blair | |
| 5,065,932 A | 11/1991 | Hayden et al. | |
| 5,066,849 A | 11/1991 | DeKam | |
| 5,080,277 A | 1/1992 | Diaconu et al. | |
| 5,083,117 A | 1/1992 | Hoigaard | |
| 5,104,689 A | 4/1992 | Hayden et al. | |
| 5,117,091 A | 5/1992 | Ely | |
| 5,122,637 A | 6/1992 | Bottorff et al. | |
| 5,127,572 A | 7/1992 | Pazhouhesh et al. | |
| 5,130,640 A | 7/1992 | Gambill et al. | |
| 5,143,272 A | 9/1992 | Carlomagno et al. | |
| 5,151,574 A | 9/1992 | Urban | |
| 5,182,435 A | 1/1993 | Wang | |
| 5,215,241 A | 6/1993 | Myers | |
| 5,261,590 A | 11/1993 | Tsai | |
| 5,280,851 A | 1/1994 | Neukum | |
| 5,314,544 A | 5/1994 | Oweis | |
| 5,315,484 A | 5/1994 | Asano | |
| 5,329,085 A * | 7/1994 | Cowell et al. | 219/616 |
| 5,332,144 A | 7/1994 | Cannon | |
| 5,333,821 A | 8/1994 | Lee | |
| 5,362,255 A | 11/1994 | Anhalt | |
| 5,379,941 A | 1/1995 | Partel | |
| 5,408,072 A * | 4/1995 | Nagase | 219/616 |
| 5,412,178 A | 5/1995 | Tamura | |
| 5,422,457 A | 6/1995 | Tang et al. | |
| 5,423,472 A | 6/1995 | Tsai | |
| 5,446,261 A | 8/1995 | Hernandez et al. | |
| 5,446,262 A | 8/1995 | McCambridge | |
| 5,466,149 A | 11/1995 | Tsai | |
| 5,472,133 A | 12/1995 | Lin | |
| 5,483,040 A | 1/1996 | Fortune | |
| 5,495,093 A | 2/1996 | Griffith | |
| 5,497,963 A | 3/1996 | Lee | |
| 5,542,600 A | 8/1996 | Kobayashi et al. | |
| 5,569,400 A | 10/1996 | Lee | |
| 5,574,386 A | 11/1996 | Beaumont et al. | |
| 5,575,417 A | 11/1996 | Allison et al. | |
| 5,641,112 A | 6/1997 | Moradi et al. | |
| 5,690,847 A | 11/1997 | LaValley et al. | |
| 5,771,880 A | 6/1998 | Tsai | |
| 5,796,072 A | 8/1998 | Okuno | |
| 5,837,973 A | 11/1998 | Tamura | |
| 5,853,418 A | 12/1998 | Ken et al. | |
| 5,860,575 A | 1/1999 | Akin et al. | |
| 5,864,118 A * | 1/1999 | Backlund | 219/233 |
| 5,879,217 A | 3/1999 | Saito et al. | |
| 5,911,354 A | 6/1999 | Chou | |
| 5,917,156 A | 6/1999 | Nobori et al. | |
| 5,928,536 A | 7/1999 | Lee | |

| Patent | Date | Inventor |
|---|---|---|
| 6,013,084 A | 1/2000 | Ken et al. |
| 6,019,270 A * | 2/2000 | Boll et al. .................... 228/54 |
| 6,045,025 A | 4/2000 | Muramatsu et al. |
| 6,054,678 A * | 4/2000 | Miyazaki .................. 219/237 |
| 6,087,631 A | 7/2000 | Miyazaki |
| 6,111,222 A | 8/2000 | Hattori |
| 6,123,248 A | 9/2000 | Tadauchi et al. |
| 6,193,728 B1 | 2/2001 | Ken et al. |
| 6,215,104 B1 | 4/2001 | Kurpiela et al. |
| 6,231,387 B1 | 5/2001 | Kameyama |
| 6,244,853 B1 | 6/2001 | Oglesby et al. |
| 6,247,631 B1 | 6/2001 | Kawakatsu et al. |
| 6,290,118 B1 | 9/2001 | Muramatsu et al. |
| 6,306,516 B1 | 10/2001 | Jin et al. |
| 6,310,557 B1 | 10/2001 | Nelsen et al. |
| 6,319,617 B1 | 11/2001 | Jin et al. |
| 6,329,641 B1 | 12/2001 | Miyazaki et al. |
| 6,357,649 B1 | 3/2002 | Okatsu et al. |
| 6,369,359 B1 | 4/2002 | Morrison |
| 6,378,758 B1 | 4/2002 | Haba |
| 6,386,423 B1 | 5/2002 | Adler et al. |
| 6,405,918 B1 | 6/2002 | Claridge et al. |
| 6,455,813 B1 | 9/2002 | Sakamoto et al. |
| 6,464,122 B1 | 10/2002 | Tadauchi et al. |
| 6,471,109 B2 | 10/2002 | Muramatsu et al. |
| 6,513,697 B1 | 2/2003 | Sines et al. |
| 6,536,650 B1 | 3/2003 | Dunham et al. |
| 6,580,050 B1 | 6/2003 | Miller et al. |
| 6,604,255 B2 | 8/2003 | Hayashi |
| 6,613,159 B1 | 9/2003 | Koch et al. |
| 6,629,631 B2 | 10/2003 | Murtishaw |
| 6,633,021 B2 | 10/2003 | Matubara |
| 6,646,228 B2 | 11/2003 | Axinte et al. |
| 6,653,600 B2 | 11/2003 | Sakamoto et al. |
| 6,681,980 B2 | 1/2004 | Kaneko |
| 6,710,304 B2 | 3/2004 | Yokoo |
| 6,742,702 B2 | 6/2004 | Abe |
| D494,433 S | 8/2004 | Vann |
| 6,786,386 B2 | 9/2004 | Miyazaki |
| 6,793,114 B2 | 9/2004 | Dunham et al. |
| 6,793,115 B2 | 9/2004 | Lin |
| 6,793,125 B2 | 9/2004 | Foley et al. |
| 6,797,924 B1 | 9/2004 | Axinte et al. |
| 6,818,862 B2 | 11/2004 | Uetani et al. |
| 6,831,252 B1 | 12/2004 | Crookshanks |
| 6,833,531 B1 | 12/2004 | Masaki |
| 6,874,671 B2 | 4/2005 | Hirano et al. |
| 6,887,319 B2 | 5/2005 | Suga et al. |
| 6,916,859 B2 | 7/2005 | Hirofumi |
| 6,989,511 B1 | 1/2006 | Tsai |
| 7,030,339 B2 | 4/2006 | Nagase et al. |
| 7,060,937 B2 | 6/2006 | Konishi |
| 7,126,086 B2 | 10/2006 | Konishi et al. |
| 7,137,584 B2 | 11/2006 | Wong |
| 7,138,086 B2 | 11/2006 | Sawamura et al. |
| 7,259,356 B2 * | 8/2007 | Cowell et al. ............... 219/238 |
| 2004/0065653 A1 * | 4/2004 | Uetani et al. ................ 219/229 |

OTHER PUBLICATIONS

European Patent Office, European Search Report in EP Application No. 08169974, Mar. 24, 2009.

Weller-Cooper Tools Article, Extending Soldering Iron Tip Life, 3pp., undated.

EMT Article, Top Tips for extending tip life, 3pp., Jul. 2006.

* cited by examiner

SOLDERING TIP, SOLDERING IRON, AND SOLDERING SYSTEM

FIELD OF THE INVENTION

This invention generally relates to soldering systems and soldering irons and more particularly to a soldering tip that is not wetted by molten solder.

BACKGROUND OF THE INVENTION

Existing soldering iron technology employs a "wettable" soldering tip. In other words, the soldering tip is designed to facilitate the spreading of molten solder over its working surface. Metals such as iron, iron-nickel, and other iron alloys are often used in soldering tips since they are wetted by molten solder and yet do not deteriorate extensively while in contact with the molten solder.

Wetting may be empirically observed by placing a droplet or bead of a liquid on a surface. The shape of the bead qualitatively indicates the nature of the wetting between the liquid and the surface. If the bead flattens out much like a pancake, then the liquid wets the surface. If the bead remains nearly spherically shaped, like water on a recently waxed car surface, the liquid does not wet the surface. Thus, a molten solder that does not wet a surface of a soldering tip will, under the influence of gravity or some other force, tend to be shed from that surface. In contrast, a molten solder that wets the surface of the soldering tip will tend to cling or adhere to that surface. As previously mentioned, molten solders tend to wet iron and iron-nickel alloy soldering tips.

Quantitatively, a contact angle formed between a droplet of molten solder and the surface of the soldering tip may be measured to determine the wettability of the molten solder on the soldering tip. The contact angle is measured between the interface of the molten solder and a surface of the soldering tip and the surface of the droplet of molten solder. Thus, contact angles measured greater than 90 degrees indicate that the molten solder does not wet the soldering tip. That is, the droplet of molten solder is somewhat spherical. On the other hand, contact angles less than 90 degrees indicate that the molten solder wets the surface of the soldering tip. In other words, the droplet of molten solder flattens and tends to adhere or cling to the surface of the soldering tip. Therefore, while soldering with a wettable soldering tip, molten solder adheres to the soldering tip.

One problem with existing soldering tips is the variability in the amount of solder transferred to the joint. In particular, this problem manifests itself in high-volume soldering processes, such as soldering electrical connections in electronic devices and the like. Although the amount of solder transferred depends upon a number of factors, one primary factor is the amount of the solder that clings or adheres to the soldering tip. In other words, the amount of solder transferred to the joint is directly related to how much solder adheres to the tip from one joint to the next.

Not only is the variation in the amount of solder transferred to the joint a problem, but it is difficult or impossible for an operator to determine the amount of heat transferred from the soldering tip to the joint. Heat transfer to the workpieces depends on the amount of molten solder between the workpieces and the soldering tip. Thus, variable amounts of molten solder on the soldering tip cause variation in the quantity of heat transferred to the workpiece. In many instances too much heat will damage the component, and, on the other hand, too little heat or too little solder, or both too little heat and too little solder, may result in a poorly formed joint. If that is not enough, a host of other problems ensue due to the wettable nature of the prior art soldering tips. For instance, solder spikes and solder bridges between successive connections are known to form due to the molten solder adhering to the soldering tip as the tip is withdrawn.

Accordingly, a soldering system having a soldering tip that facilitates a repeatable transfer of solder to a series of successive joints is needed.

SUMMARY OF THE INVENTION

The present invention provides a soldering tip comprising a non-wetting solder contact layer. The non-wetting solder contact layer is adapted to conduct heat to a solder, to melt the solder, and to be in contact with the molten solder. The non-wetting solder contact layer comprises a material that is not wettable by the molten solder. In another embodiment, a contact angle measured between a droplet of the molten solder and the non-wetting solder contact layer is greater than about 90 degrees.

In accordance with the invention, a soldering iron is also provided. In one embodiment, the soldering iron includes the soldering tip and an energy generating system in communication with the non-wetting solder contact layer of the soldering iron. The energy generating system is adapted to create heat to melt the solder. In one embodiment, the energy generating system is an induction system adapted to induce heating of the non-wetting solder contact layer. In another embodiment, the energy generating system is an electrical power supply in electrical communication with the non-wetting solder contact layer such that heat is generated when electricity flows through the non-wetting solder contact layer. In yet another embodiment, the energy generating system is a heat generating system in thermal communication with the non-wetting solder contact layer. Heat generated by the heat generation system flows through the non-wetting solder contact layer to melt the solder.

Also provided in accordance with the invention is a soldering system for melting a solder to form a joint between a first workpiece and a second workpiece. The system comprises the energy generating system, the soldering tip comprising the non-wetting solder contact layer, and a dispenser. The dispenser is adapted to dispense controlled amounts of the solder to a location proximate the soldering tip or the first workpiece and optionally the second workpiece.

In accordance with the invention, there is also provided a method of controlling an amount of a solder applied to form a joint. The method comprises providing a solder to a dispenser, providing a first workpiece in contact with a second workpiece, dispensing a dispensed amount of the solder from the dispenser to a location of the soldering tip proximate the first workpiece and optionally the second workpiece, heating the solder to a temperature of at least a melting temperature of the solder with heat conducted through the soldering tip, and withdrawing the soldering tip from the solder while the solder is in the molten state such that the soldering tip is substantially free of the molten solder.

These and other objects, advantages and features of the invention will become more readily apparent to those of ordinary skill in the art upon review of the following detailed description taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
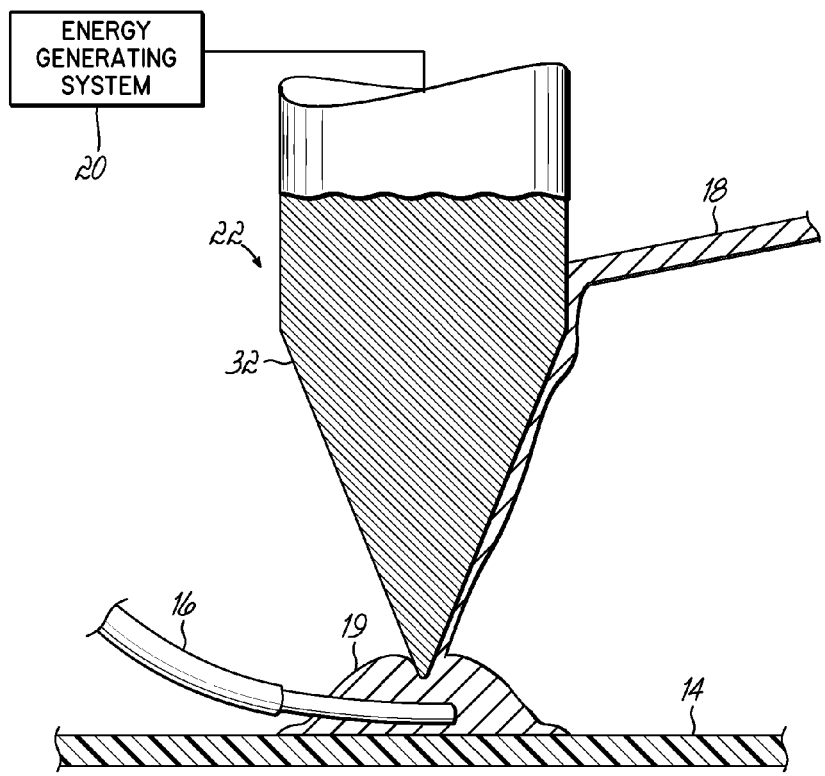
FIG. 1 is a partial cross-sectional view of one embodiment of a soldering tip in communication with an energy generating system.

Referring to FIG. 1, in one embodiment, a soldering system 10 is adapted to form a joint 12 between a first workpiece 14 and a second workpiece 16 by melting a solder 18 and heating the workpieces 14, 16 such that a molten solder 19 wets the workpieces 14, 16. The joint 12 is formed when the molten solder 19 solidifies. The soldering system 10 comprises an energy generating system 20 in operative communication with a soldering tip 22. As is known in the art, the energy generating system 20 may be, for example, an induction system capable of induction heating the soldering tip 22, an electrical power supply capable of electrically powering a circuit containing the soldering tip 22 where the soldering tip 22 may have sufficient electrical resistance such that it heats when current passes through it (often referred to as Joule heating), or an electrical resistive heating system which may provide heat to a shank 24 or other thermally conductive conduit in thermal communication with the soldering tip 22, as shown in FIG. 2.

Figure 2:
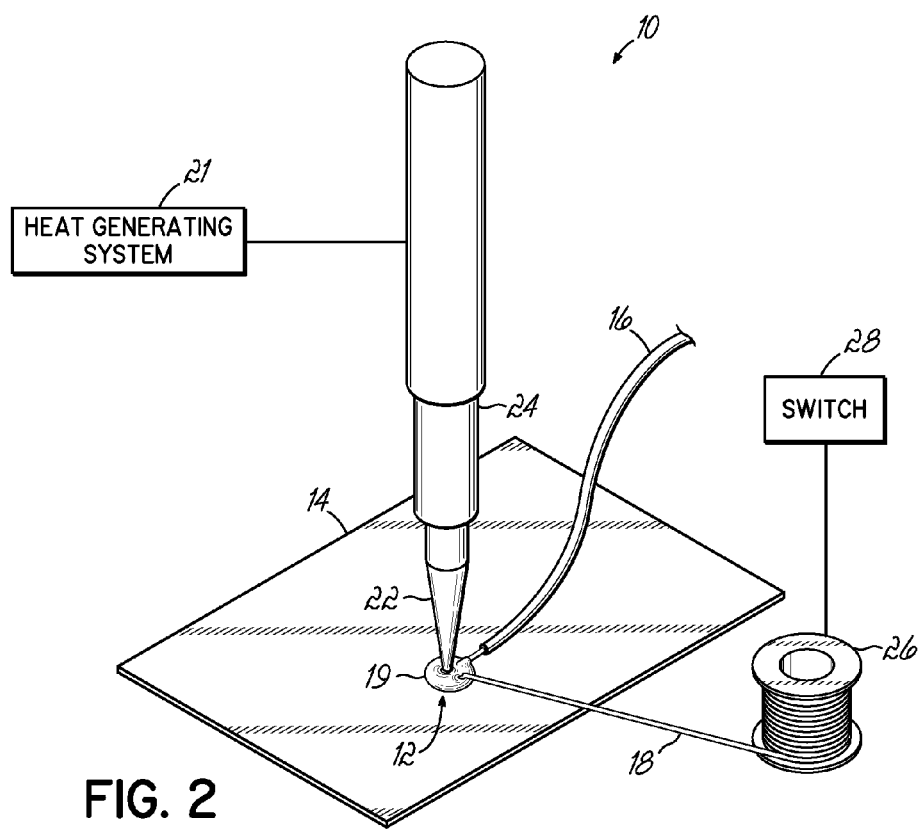
FIG. 2 is a diagrammatic perspective view of one embodiment of a soldering system.
Figure 2A:
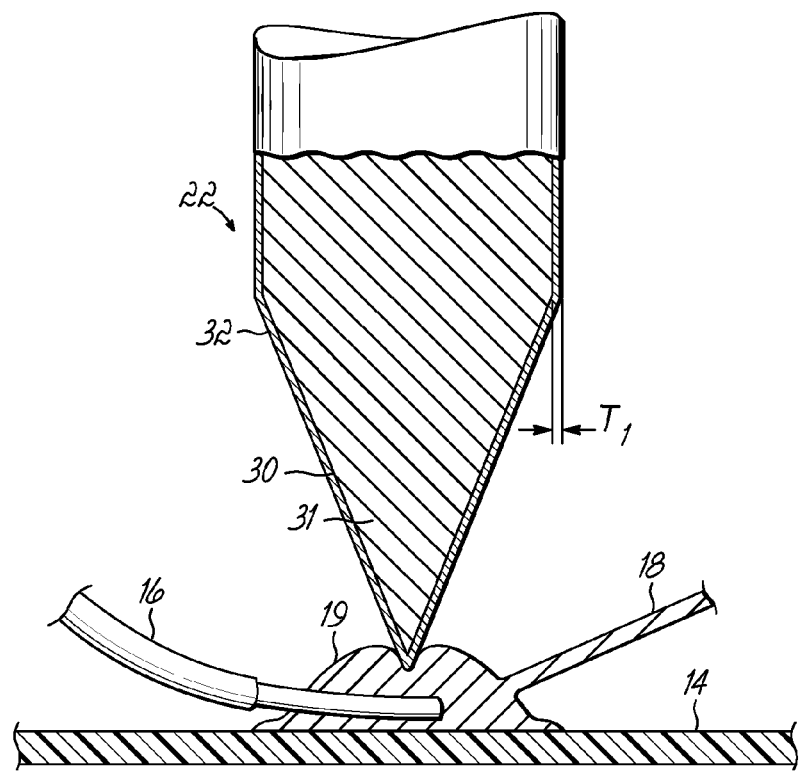
FIG. 2A is a partial cross-sectional view of one embodiment of a soldering tip.

In another embodiment and with continued reference to FIG. 2, the system 10 includes a dispenser 26 for dispensing controlled amounts of the solder 18 proximate to both the workpieces 14, 16 and the soldering tip 22. The dispenser 26 may be any one of a number of automatic or manually operated dispensers or feed mechanisms known in the art for providing solder. It will be appreciated that the dispenser 26 may dispense or feed solder to contact the shank 24, as shown in FIG. 1 or to provide solder adjacent the soldering tip 22, as shown in FIGS. 2 and 2A.

In yet another embodiment, the system 10 includes a switch 28 in operable communication with the dispenser 26, as shown in FIG. 2. The switch 28 may be used to activate the dispenser 26 to distribute controlled amounts of the solder 18. The switch 28 may be positioned such that an operator may activate the switch 28 manually, usually with a finger or a foot, or alternatively by automatic control in cooperation with a sensor, such as one that utilizes capacitance. For example, the operator may initially position the soldering tip 22 proximate the workpieces 14, 16, such as a circuit board and an electrical lead, as shown. Once the soldering tip 22 is in the desired position, the operator may dispense a controlled amount of the solder 18 at or near the soldering tip 22 by operating the dispenser 26 with a foot-pedal switch. While FIG. 2 may be perceived as a manual soldering system, for instance, a hand-held soldering iron, the system 10 may be automatic, for example, a soldering iron attached to a robotic positioning system.

With reference once again to FIG. 1, the soldering tip 22 includes a non-wetting solder contact layer 32. The non-wetting solder contact layer 32 is in operative communication with an energy generating system 20, as previously described, such that heat generated in cooperation with the energy generating system 20 and conducted from the non-wetting solder contact layer 32 is capable of melting the solder 18 in contact with it. Thus, activation of the energy generating system 20 causes energy (electrical, magnetic, or thermal) to be generated. In turn, that energy causes heat to flow to and/or through the non-wetting solder contact layer 32, via conduction, or causes the non-wetting solder contact layer 32 to generate heat, e.g. via induction or via Joule heating.

The heat produced with energy from any one of the energy generating systems 20, as described previously, melts the solder 18 in contact with the non-wetting solder contact layer 32 and may also heat the workpieces 14, 16. The molten solder 19 may form a pool adjacent the non-wetting solder contact layer 32. Thus, during soldering, the soldering tip 22 is at least partially in contact with the molten solder 19. Once a sufficient amount of the solder 18 is dispensed into the pool and the molten solder 19 wets the workpieces 14, 16, the soldering tip 22 is withdrawn. The joint 12 then forms upon solidification of the molten solder 19 as it cools. Those skilled in the art will appreciate that the workpieces 14, 16 may comprise metal components, and while reference to soldering on printed circuit boards, wires, and electric terminals may be made herein, the invention is not limited thereto.

As previously mentioned, the non-wetting solder contact layer 32 comprises a material that is not wettable by the molten solder 19 or molten solder and flux combinations. Furthermore, as shown in FIGS. 1, 2, 2A, and 3, by way of example and not limitation, the non-wetting solder contact layer 32 may be cone shaped. Although, a cone-shaped configuration is illustrated, one skilled in the art will observe that other shapes, for example, a chisel shape, a diamond-like or pyramidal shape, other shapes having a flat surface, or virtually any other shape may be used. Additionally, though not shown in the figures, the non-wetting solder contact layer 32 may have a shape that includes a trough or channel that runs longitudinally the length of the soldering tip 22. As is known in the art, solder may be introduced into the trough at some distance from one or both workpieces 14, 16. The solder may melt in the trough and subsequently flow toward the workpieces 14, 16 where the joint 12 is formed, as shown in FIG. 1.

Referring now to FIG. 2A, in one embodiment, the soldering tip 22 also includes a support structure 30 with the non-wetting solder contact layer 32 covering a portion of the support structure 30. The support structure 30 may provide mechanical rigidity for the non-wetting solder contact layer 32. Thus, the support structure 30 may support the non-wetting solder contact layer 32 during potentially forcible contact with the workpieces 14, 16. In one embodiment, the support structure 30 is in operative communication with the energy generating system 20. For example, in some embodiments, the support structure 30 may be heated by the energy generating system 20 via induction or Joule heating. Consequently, the support structure 30 may conduct heat to the non-wetting solder contact layer 32 to melt the solder.

In another embodiment, as shown in FIGS. 2 and 2A, the support structure 30 is a heat conductive core 31 that is in thermal communication with a heat generating system 21 (shown in FIG. 2) and the non-wetting solder contact layer 32. Thus, the heat conductive core 31 conducts heat to the non-wetting solder contact layer 32. In one embodiment, the non-wetting solder contact layer 32 is in direct and continuous contact with the heat conductive core 31. The non-wetting solder contact layer 32 may encase nearly the entire surface of the heat conductive core 31, thus preventing the molten solder 19 from coming into contact with the heat conductive core 31.

By way of example and not limitation, the heat conductive core 31 may comprise copper, though other thermally conductive materials may be used to conduct heat from the heat generating system 21 to the non-wetting solder contact layer 32. As is known in the art, copper may deteriorate quickly in contact with the molten solder 19. Thus, in one embodiment, the non-wetting solder contact layer 32 covers a portion of the heat conductive core 31 to substantially prevent the molten solder 19 from contacting the heat conductive core 31.

In another embodiment, the non-wetting solder contact layer 32 may be a coating formed on the support structure 30. The coating may be formed by methods known in the art, such as one or more electrodeposition processes including, for example, electroplating. By way of additional example, other coating processes may include dip coating; vapor deposition processes, e.g. PVD and CVD; or ion beam assisted deposition (IBAD), as are known in the art.

As previously briefly described, the non-wetting solder contact layer 32 comprises a material that is not wettable by the molten solder 19 or molten solder and flux combinations. The non-wetting solder contact layer 32 may comprise chromium or a chromium alloy; titanium or a titanium alloy; niobium or a niobium alloy; molybdenum; tungsten; a metal nitride, such as titanium nitride, chromium nitride, or aluminum nitride; a metal phosphate compound such as an aluminum phosphate compound; a metal oxide, such as alumina; a refractory metal such as platinum; or a refractory metal alloy such as a platinum-rhodium alloy, or nonfusible metal (i.e. a metal that molten tin will not substantially penetrate into at normal operating temperatures). For example, one commercially available phosphate compound, sold under the trademark CERABLAK™, may be used to form the non-wetting solder contact layer 32 and is available from Applied Thin Films, Inc. in Evanston, Ill. Non-wettable material refers to a material that is not wet by the molten solder 19 (with or without a flux), i.e., to which the molten solder 19 does not appreciably adhere. One indication that the material is non-wettable is that the contact angle of a droplet of the molten solder 19 in contact with the non-wetting solder contact layer 32 is greater than about 90 degrees. Another indication is that molten solder 19 on the soldering tip 22 is shed from the surface in essentially bead form. The non-wetting solder contact layer 32 may comprise a single non-wettable metal element, or may comprise an alloy or other combination of elements having the overall characteristic of being non-wettable.

According to one embodiment, the non-wetting solder contact layer 32 consists essentially of chromium, titanium, chromium nitride, titanium nitride, or combinations thereof. By "consisting essentially of" means that no other elements are intentionally added to the material forming the non-wetting solder contact layer 32. However, impurity content of other elements from the raw materials or the fabrication process may be contemplated.

In another embodiment, the non-wetting solder contact layer 32 consists essentially of chromium. Chromium may be plated on the support structure 30 by methods known in the art. In this embodiment, a thickness $T_1$ of the non-wetting solder contact layer 32 is at least about 50 microinches (about 1.3 μm), for example about 50 microinches to about 3000 microinches (about 1.3 μm to about 76.2 μm). Thinner coatings of chromium may exhibit excessive porosity or cracking possibly allowing molten solder to directly contact the support structure 30. On the other hand, thicker coatings may initially reduce heat transfer to the solder 18 and the workpieces 14, 16. One skilled in the art will appreciate that the material that the non-wetting solder contact layer 32 is made of may dictate the thickness of the non-wetting solder contact layer 32. Additionally, in those embodiments wherein the energy generating system 20 is an induction system or an electrical power supply, the non-wetting solder contact layer 32 may be sufficiently thick to provide thermal mass such that pressure from the contact with the solder 18 and workpieces 14, 16 do not appreciably deform the non-wetting solder contact layer 32 or decrease the temperature of the non-wetting solder contact layer 32. In other words, the configuration of the non-wetting solder contact layer 32 should provide mechanical rigidity, as well as have sufficient thermal mass for a particular soldering process.

In another embodiment, the non-wetting solder contact layer 32 may comprise a coating impregnated with any one or more of the previously mentioned materials. For example, the non-wetting solder contact layer 32 may be a ferrous or non-ferrous metal impregnated with chromium nitride in sufficient volumes to inhibit wetting of the non-wetting solder contact layer 32 by the molten solder 19. The thickness $T_1$ of the non-wetting solder contact layer 32 comprising chromium nitride may be less than about 0.01 μm, i.e. just a few atomic layers of the material, possibly facilitating rapid heat transfer to the solder 18 and the workpieces 14, 16 while providing a non-wetting surface.

The solder 18 may be one of the various soldering alloys commercially available, such as from EFD, Inc. of East Providence, R.I. The solder 18 may be configured as a wire, as shown in FIGS. 1 and 2, or a paste as a first component and a flux as a second component. The flux, e.g., water-soluble, no-clean, rosin mildly activated, or rosin activated, may be added to the wire or paste to facilitate wetting of the workpieces 14, 16.

The solder 18 may comprise one or more metals. By way of example, the solder 18 may comprise tin, lead, silver, bismuth, copper, or antimony or alloys or combinations thereof. Alloys of various combinations of the above-mentioned elements may each have a specific application. However, widely used solder alloys include, for example, tin-lead alloys, e.g. 60Sn-40Pb and 63Sn-37Pb. However, "lead-free" soldering alloys are known in the art, for example, tin-copper and tin-antimony alloy based solders.

It will be appreciated that in some cases the process of soldering with these alloys may be similar, varying only in melting temperature. However, the higher melting temperature solders, particularly the lead-free solders, tend to be more sensitive to process conditions. Moreover, in the prior art, the higher operating temperatures place greater demand on all components causing them to wear more quickly and fail more often. For example, prior art soldering tips degrade more quickly at elevated temperatures necessitating more frequent maintenance and replacement. In addition, the higher melting temperature solders may be less forgiving from a process standpoint. That is, they may be more likely to form shoulder spikes and promote solder bridging between components when the process parameters are not exactly right. Therefore, one aspect of the soldering tip 22 may include prolonged tip life, reduced defects, and an overall reduction in manufacturing costs.

During soldering then and with reference to FIG. 2A, the non-wetting solder contact layer 32 is heated to a temperature of at least a melting temperature of the solder 18, and generally no greater than about 840° F. (450° C.), which is considered the boundary between soldering and the higher temperature brazing process. For example, the melting temperature of tin-lead solder is about 361.4° F. (180° C.) with some of the lead-free tin alloys (e.g. 20Sn 80Au) having melting temperatures as high as 536° F. (280° C.). As a result, when the solder 18 contacts the non-wetting solder contact layer 32, the solder 18 melts. Therefore, the molten solder 19 contacts the non-wetting solder contact layer 32 as well as the workpieces 14, 16. However, unlike the prior art soldering tips, the molten solder 19 does not wet the non-wetting solder contact layer 32. In other words, a contact angle of a droplet of the molten solder 19 in contact with the non-wetting solder contact layer 32 is greater than about 90 degrees, for example approaching 180 degrees. Thus the molten solder 19 does not appreciably adhere to the non-wetting solder contact layer 32.

Figure 3:
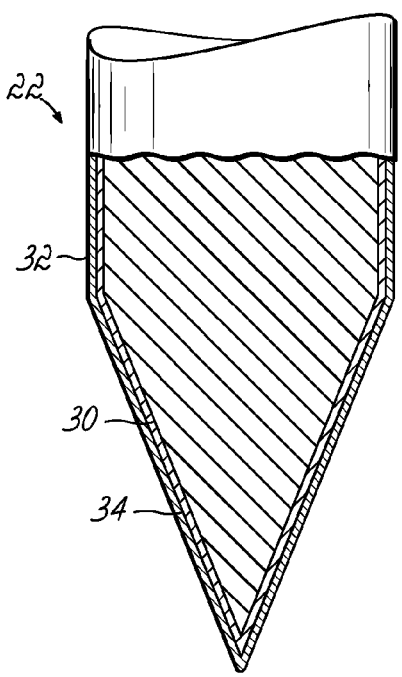
FIG. 3 is a partial cross-sectional view of another embodiment of the soldering tip.

With reference now to FIG. 3, in another embodiment, the soldering tip 22 comprises a protective layer 34 covering at least a portion of the support structure 30. The non-wetting solder contact layer 32 is in thermal communication with the protective layer 34 and covers at least a portion of the support structure 30. In one embodiment, the protective layer 34 may be situated between and in direct and continuous contact with the support structure 30 and the non-wetting solder contact layer 32. The protective layer 34 is adapted to transfer heat from the support structure 30 to the non-wetting solder contact layer 32. The protective layer 34 is also adapted to prevent the molten solder 19, shown in FIG. 2, from directly contacting the support structure 30.

As previously mentioned, molten solders are known to chemically attack and degrade other metals, including copper. In the event that an opening is formed in the non-wetting solder contact layer 32, such as from a scratch, a crack, or an area worn through due to use or abuse of the soldering tip 22, a copper heat conductive core, for example, is not destroyed. The non-wetting solder contact layer 32 may then be reworked or reformed to prolong the usefulness of the soldering tip 22. In one embodiment, the protective layer 34 comprises nickel or a nickel alloy. The protective layer 34 may also facilitate bonding of the non-wetting solder contact layer 32 to the support structure 30 by providing an intermediate thermal expansion coefficient between a thermal expansion coefficient of the support structure 30 and a thermal expansion coefficient of the non-wetting solder contact layer 32.

With reference once again to FIG. 1, embodiments of the soldering system 10, as described herein, may reduce costs by reducing the percentage of defective joints and thus eliminating the need to rework them. In one embodiment, the system 10 is adapted to reduce costs and improve the quality of joints made to connect various electronic components. One aspect of the soldering system 10 permits accurate and repeatable control of an amount of the solder 18 in each joint 12 and the heat added to each joint 12. It will be appreciated that an amount of the solder 18 dispensed from the dispenser 26 may be nearly the same as an amount of solder that forms the joint 12. Therefore, many joints may be made with the amount of the solder 18 in each joint 12 being substantially the same. For example, an amount of the solder 18 in a first joint may be approximately the same as the amount of the solder 18 in a second joint since little to no solder adheres to the non-wetting solder contact layer 32. Consequently, excessive consumption of solder may be reduced or eliminated, and additionally, the contact time between the soldering tip 22 and the workpieces 14, 16 is more closely controlled thus preventing possible deterioration of temperature sensitive workpieces.

Thus, in use, the soldering system 10 having a soldering tip 22 comprising a support structure 30 and a non-wetting solder contact layer 32 applies a controlled amount of the solder 18 to form a joint 12 between a first workpiece 14 and a second workpiece 16. To that end, a method of the invention includes providing solder 18 to a dispenser 26 in operative communication with the soldering tip 22. The dispenser 26 dispenses a dispensed amount of the solder 18 to the soldering tip 22 proximate one or both of the workpieces 14, 16. The method further includes heating the dispensed solder 18 to at least its melting temperature by heat conducted through the soldering tip 22 to provide molten solder 19 in contact with the non-wetting solder contact layer 32 and one or both of the workpieces 14, 16. The soldering tip 22 is then withdrawn, leaving the dispensed solder to cool and form the joint 12 between the workpieces 14, 16, with substantially none of the dispensed solder adhering to the withdrawn soldering tip 22, i.e., the withdrawn soldering tip 22 is substantially free of the molten solder 19. This process can be repeated with new workpieces, each formed joint containing substantially the same amount of solder.

While the present invention has been illustrated by a description of various preferred embodiments and while these embodiments have been described in some detail, it is not the intention of the Applicants to restrict or in any way limit the scope of the appended claims to such detail. Additional advantages and modifications will readily appear to those skilled in the art. The various features of the invention may be used alone or in numerous combinations depending on the needs and preferences of the user.

What is claimed is:

1. A soldering tip comprising:
   a non-wetting solder contact layer adapted to conduct heat to a solder, to melt the solder, and to be in contact with the molten solder, wherein the non-wetting solder contact layer comprises a material that is not wettable by the molten solder and is configured to be in communication with an energy generating system that causes the non-wetting solder contact layer to generate heat;
   a support structure, wherein the non-wetting solder contact layer covers at least a portion of the support structure and is in thermal communication therewith; and
   a protective layer between the support structure and the non-wetting solder contact layer.

2. The soldering tip of claim 1 wherein the non-wetting solder contact layer comprises at least one of a nonfusible metal, a metal nitride, a metal oxide, a metal phosphate, a refractory metal or combinations thereof.

3. The soldering tip of claim 1 wherein the non-wetting solder contact layer comprises at least one of chromium, titanium, niobium, molybdenum, tungsten, chromium nitride, aluminum nitride, titanium nitride, an aluminum phosphate compound, or a refractory metal or combinations thereof.

4. The soldering tip of claim 1 wherein the non-wetting solder contact layer consists essentially of chromium, chromium nitride, titanium, titanium nitride, or combinations thereof.

5. The soldering tip of claim 1 wherein the protective layer comprises iron.

6. A soldering iron comprising:
   a non-wetting solder contact layer adapted to conduct heat to a solder, to melt the solder, and to be in contact with the molten solder, wherein the non-wetting solder contact layer comprises a material that is not wettable by the molten solder; and
   an energy generating system in operative communication with the non-wetting solder contact layer, wherein the energy generating system is adapted to cause the non-wetting solder contact layer to generate heat to melt the solder;
   wherein the energy generating system includes an electrical power supply in electrical communication with the non-wetting solder contact layer such that heat is generated when electricity flows through the non-wetting solder contact layer.

7. The soldering iron of claim 6 further comprising a support structure, wherein the non-wetting solder contact layer covers at least a portion of the support structure.

8. A soldering system for melting a solder to form a joint between a first workpiece and a second workpiece, the system comprising:

an energy generating system;

a soldering tip in operative communication with the energy generating system, the soldering tip comprising a non-wetting solder contact layer adapted to conduct heat to a solder, to melt the solder, and to be in contact with the molten solder, wherein the energy generating system is configured to cause the non-wetting solder contact layer to generate heat and the non-wetting solder contact layer comprises a material that is not wettable by the molten solder; and a dispenser adapted to dispense controlled amounts of the solder to a location proximate the soldering tip or the first workpiece and optionally the second workpiece;

wherein the energy generating system includes an electrical power supply in electrical communication with the non-wetting solder contact layer such that heat is generated when electricity flows through the non-wetting solder contact layer.

9. The soldering system of claim 8 further comprising a support structure, wherein the non-wetting solder contact layer covers at least a portion of the support structure.

* * * * *